Sept. 7, 1937.  H. G. R. BENNETT  2,092,202
CUTTING DEVICE
Filed April 23, 1936  4 Sheets-Sheet 2
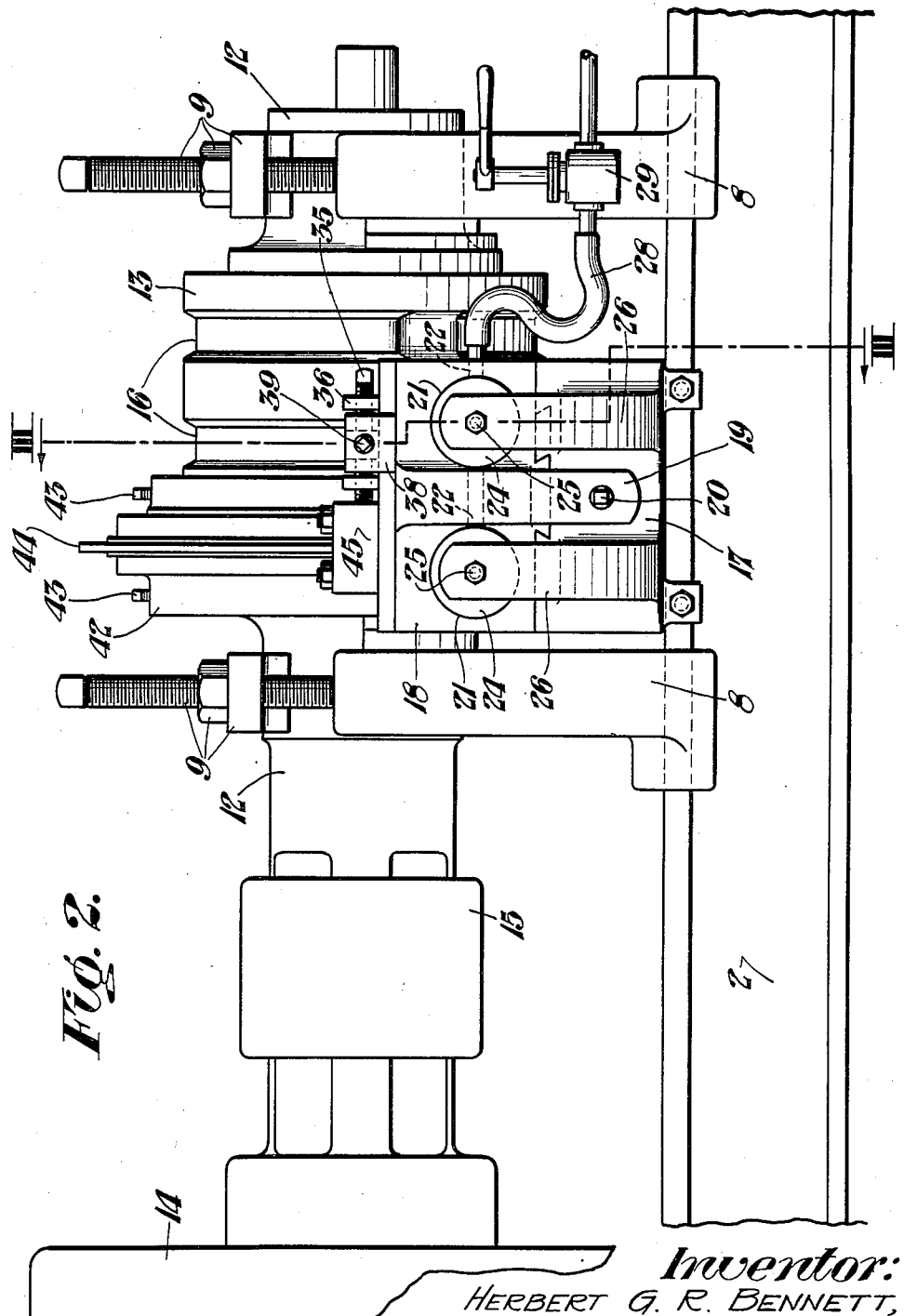
Inventor:
HERBERT G. R. BENNETT,
by: Usina & Rauber
his Attorneys

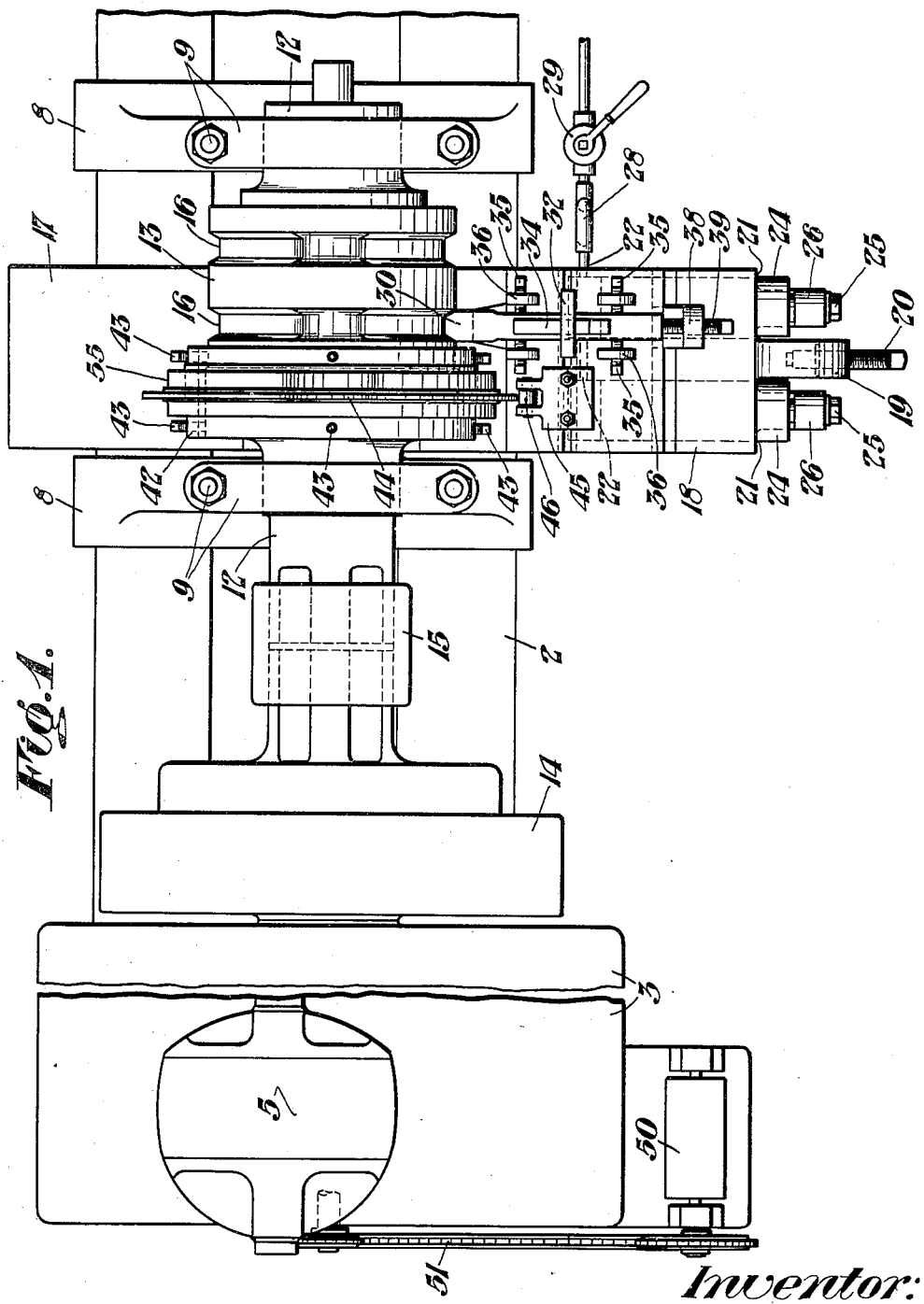

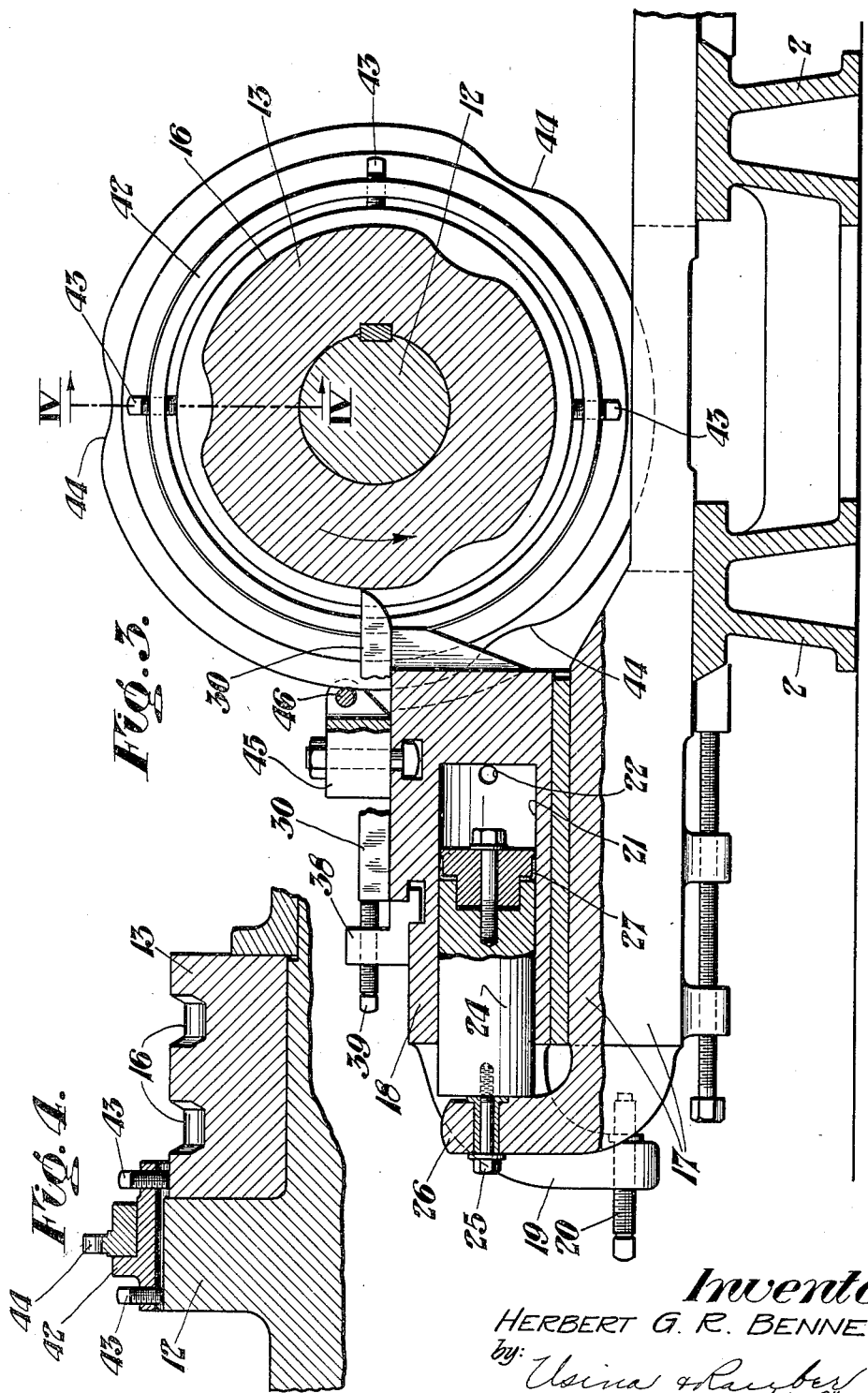

Sept. 7, 1937.      H. G. R. BENNETT      2,092,202
CUTTING DEVICE
Filed April 23, 1936        4 Sheets-Sheet 4
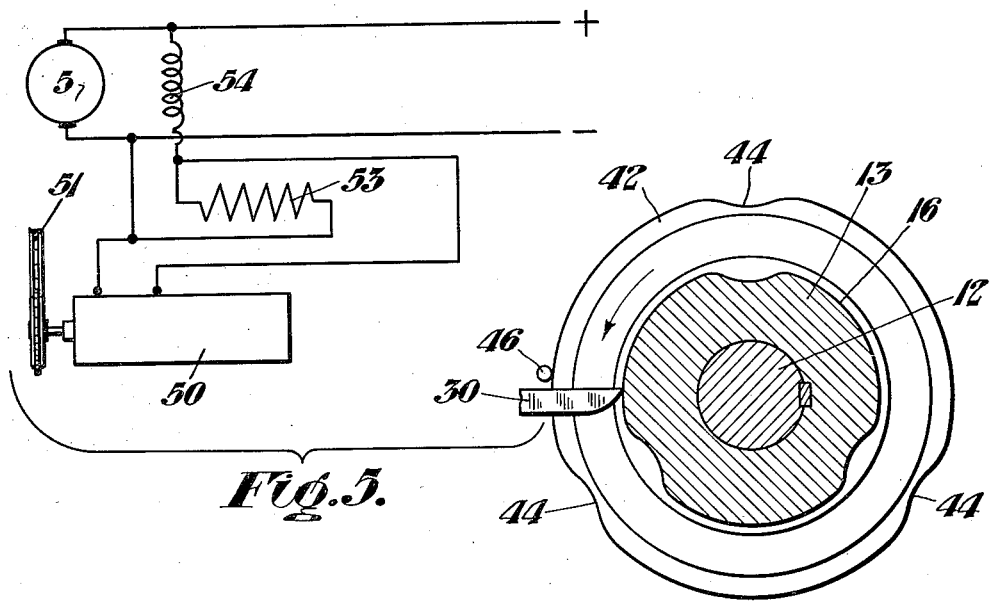
Fig. 5.
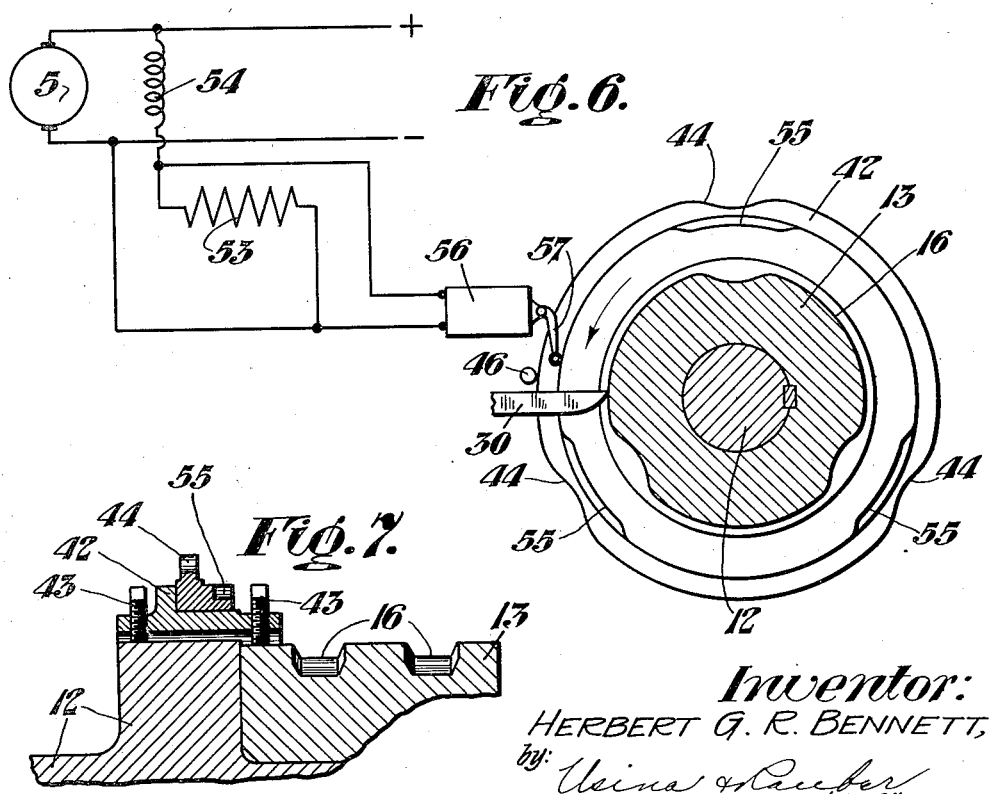
Fig. 6.
Fig. 7.
Inventor:
HERBERT G. R. BENNETT,
by: Usina & Rauber
his Attorneys.

Patented Sept. 7, 1937

2,092,202

UNITED STATES PATENT OFFICE 2,092,202

CUTTING DEVICE

Herbert G. R. Bennett, Duquesne, Pa.

Application April 23, 1936, Serial No. 76,043

1 Claim. (Cl. 82—19)

This invention relates to cutting, and more particularly to the "sinking" of matrices in the circumference of a die-roll or disk which is used in the rolling of plastic materials (such as heated metals) into various series-connected articles.

One method of forming matrices in a die-roll is to place it on a mandrel and mount the mandrel in a roll-lathe. Heretofore, the pressure of the cutting tool against the matrix-groove of the roll has been provided by the use of heavy, helical compression springs mounted on the tool-carriage. These springs do not provide a uniform pressure of the tool against the die-roll; the pressure being weakest when a cam forces the cutting tool out of contact and no cutting is being done. Furthermore, the devices of the prior art operate at a substantially constant speed, which is essentially slow. That is to say, the speed of rotation of the die-roll is always slow, regardless of whether the cutting tool is withdrawn from the shallow portion of the matrix groove or whether it is in one of the "pockets".

It is one of the objects of the present invention to provide a novel cutting apparatus which operates to apply the cutting tool with a constant pressure, as distinguished from the prior art devices previously discussed.

Another object is to provide a cutting apparatus which rotates the die roll at a slow and proper rate of speed when the cutting tool is machining out the pockets of the matrix and which speeds up the rate of rotation of the die-roll when the tool is between the pockets and in the plane groove, where no cutting is to be done. This feature clearly reduces the time required for the actual cutting operation.

The foregoing and further objects will be apparent after referring to the drawings, in which:

Figure 1 is a plan of the device of the invention.

Figure 2 is an enlarged side elevation of a part of the apparatus of Figure 1.

Figure 3 is a sectional view on the line III—III of Figure 2.

Figure 4 is a sectional view on the line IV—IV of Figure 3.

Figure 5 is a wiring diagram illustrating one method of operating the elements of the apparatus.

Figure 6 is a view similar to Figure 5 but disclosing a modification thereof.

Figure 7 is a view similar to Figure 4 but disclosing a modification for use with the wiring diagram of Figure 6.

Referring more particularly to the drawings, the numeral 2 designates the bed of a lathe. This bed 2 carries a geared head-stock 3 which is driven from an adjacent electric motor 5.

The bed 2 supports a pair of slidable journal-rests 8 which carry clamp devices 9 for holding a mandrel 12 on which the die roll, or disk, 13 is mounted. This mandrel 12 is driven by the head-stock 3 through the lathe face-plate 14 and couplings 15. The roll, or disk, 13 is preferably provided previously with a pair of grooves 16 in which the matrices are to be cut.

An adjustable saddle 17 is clamped to the bed 2. This saddle 17 carries a reciprocable tool carriage 18, which is provided on its end remote from the mandrel 12 with an extension 19 and adjusting screw 20 for positioning it with respect to the saddle. The reciprocable tool carriage 18 is bored to form a pair of horizontally extending cylinders, as shown at 21, each having an orifice 22 at its end adjacent the mandrel 12 on which the die roll, or disk, 13 is mounted. A piston 24 is disposed in each of the cylinders 21, and each of the former is secured, as at 25, to a bracket 26 which is carried by the saddle 17. Each piston 24 carries on its inner end the usual cup-leather 27. A suitable fluid under pressure is supplied to the cylinders 21 through their orifices 22 by means of a hose 28 and three-way valve 29.

A cutting-tool 30 is carried on the top of the reciprocable tool carriage 18 in a tool-yoke 32 which is provided with the usual key or wedge 34. The cutting-tool 30 is secured against lateral movement or misalinement by conventional adjusting screws 35 which are carried, as at 36, on the tool carriage. A tool back-stop 38 is also carried on the top of the tool carriage 18 and provided with the usual adjusting screw 39 for adjusting the longitudinal disposition of the cutting-tool 30.

A cam-ring 42 is clamped to the circumference of the die-roll, or disk 13, by means of a plurality of radially extending screws 43, its function being to accurately and automatically guide the cutting-tool 30 in and out in its "cross-feed" movement. This cam-ring 42 is provided with detents 44 which conform in size and number to the detents of the die-roll 13. A small frame 45 is secured to the top of the reciprocable tool carriage 18 adjacent the cam-ring 42 and provided with a hardened-steel roller 46 which continuously contacts the cam-ring.

From the foregoing description it will be readily seen that the fluid under pressure furnished through the hose 28 produces a constant and predetermined pressure of the reciprocable tool carriage 18 toward the die-roll, or disk, 13. By properly adjusting the cutting-tool 30, the hardened steel roller 46, which rides on the cam-ring 42, will present the tool to the die-roll matrices with a correspondingly constant and predetermined pressure and withhold the contact of the cutting-tool with the plain groove of the die-roll.

In order to rotate the die-roll at the most efficient speed it is necessary that the same is rapid between the pockets of the matrices but slow when the actual cutting is being effected therein. This I accomplish by automatically changing the speed of the roll-lathe in the following manner:

According to Figure 5, a multiple-contact, drum-type limit-switch 50 is connected by a chain 51 to the lathe headstock 3 whereby it is rotated at the same speed as the face-plate 14 and the die-roll 13. The lathe motor 5 is shunt-wound and its speed increased above normal by introducing a resistance 53 in its field 54. This resistance is cut "in" and "out" in proper sequence by adjusting the contacts of the multiple-contact, drum-type limit-switch 50 accordingly.

According to Figures 6 and 7 the cam-ring 42 is provided with an auxiliary cam-track 55. An adjacently disposed switch 56 is provided with a pivoted arm 57 which rides in the auxiliary cam-track 55. This switch 56 cuts the resistance 53 "in" and "out" of the field 54 of the motor 5 in the manner of the multiple-contact drum-type limit-switch 50 of Figure 5.

While I have shown and described several specific embodiments of my invention, it will be understood that I do not wish to be limited exactly thereto, since various modifications may be made without departing from the scope of my invention, as defined by the following claim.

I claim:

A cutting device comprising, in combination, a rotary work-piece carriage, means for rotating said work-piece carriage, speed-regulating means for said rotating means, a cutting tool, fluid means for holding said cutting tool in contact with the work-piece, a rotary template, means in contact with said rotary template for moving said cutting tool away from the work-piece at determined intervals, and means in contact with said rotary template for adjusting said speed-regulating means.

HERBERT G. R. BENNETT.